INVENTORS
ROBERT H. KILPATRICK
JAMES R. SPENCER
By George C. Sullivan
Agent

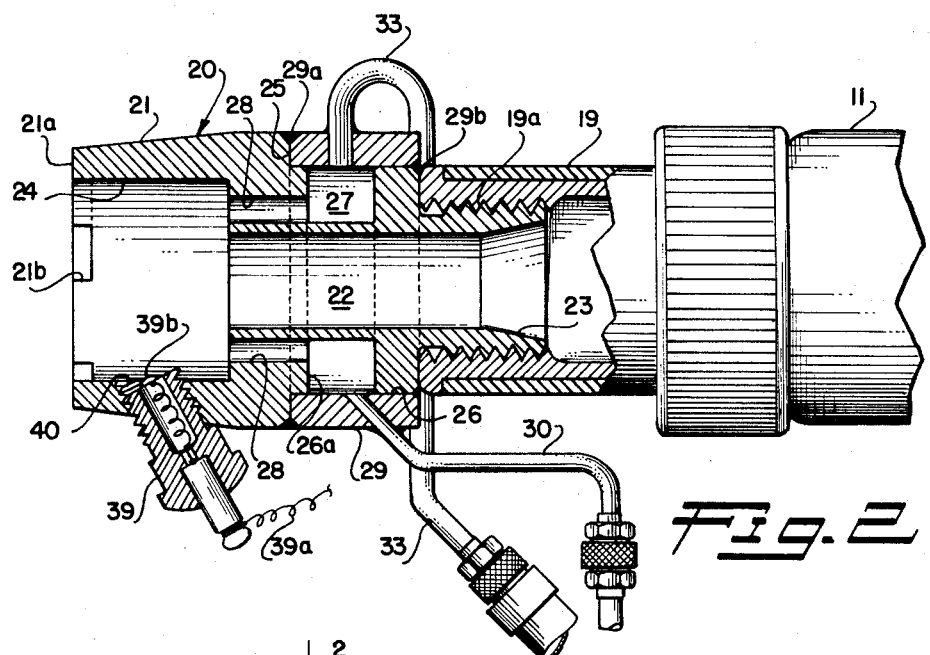
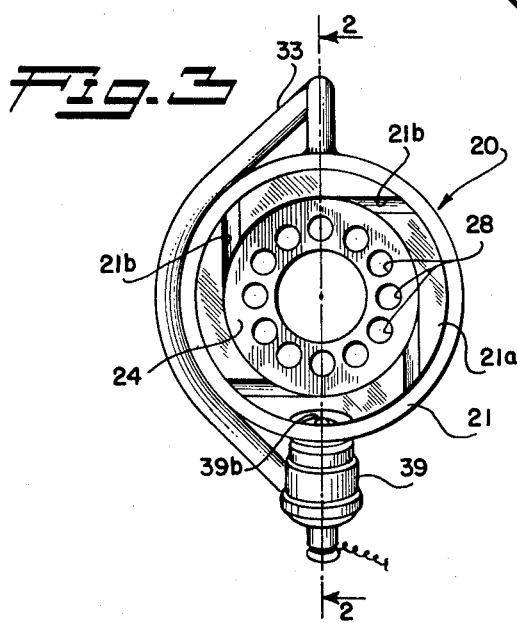
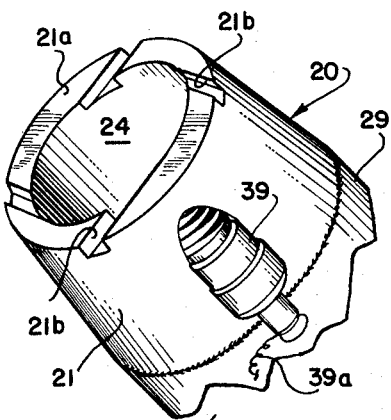

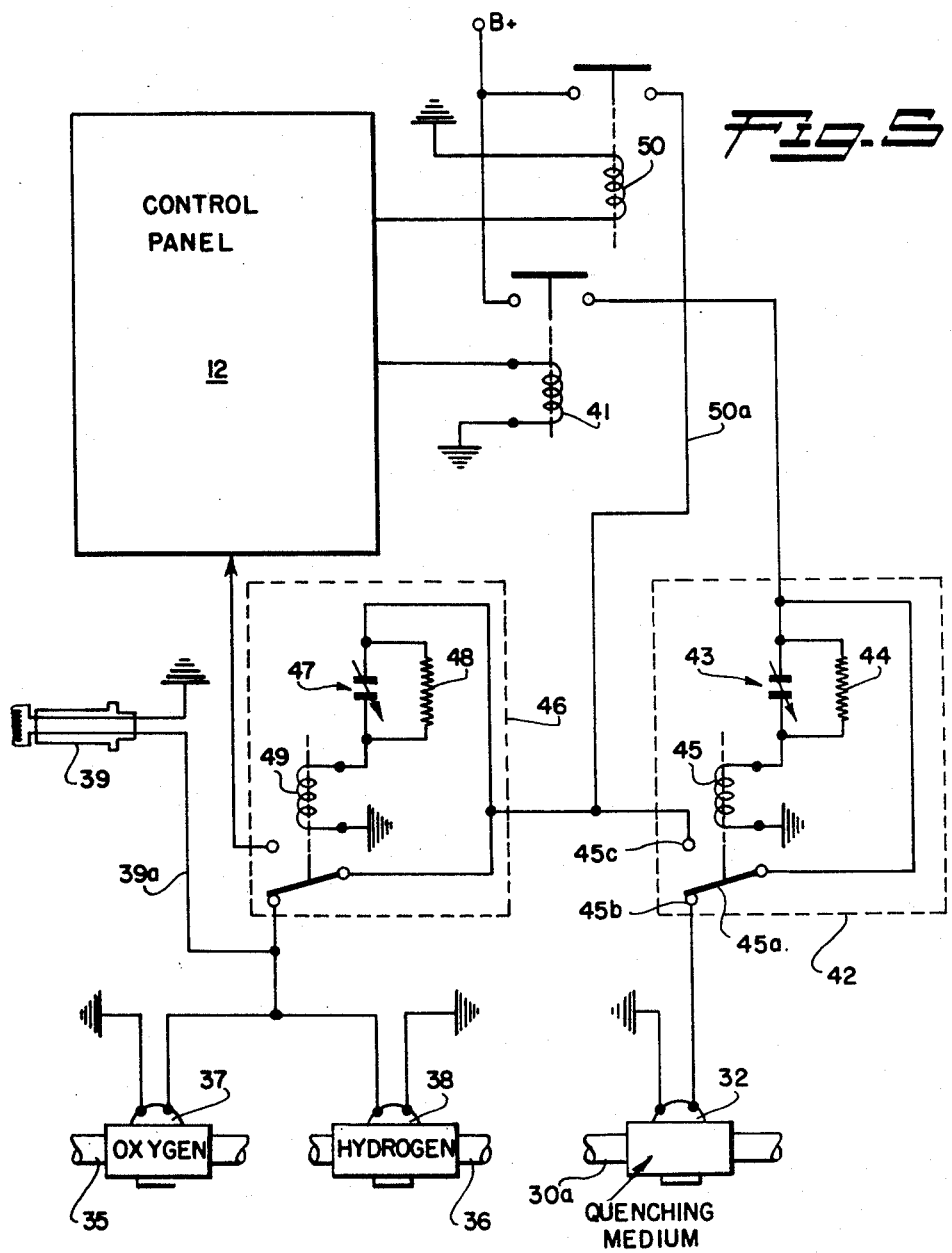

United States Patent Office 2,935,312
Patented May 3, 1960

2,935,312

APPARATUS FOR POST-HEATING WITH A SHIELDED ARC SPOTWELDING GUN

Robert H. Kilpatrick, Smyrna, and James R. Spencer, Cartersville, Ga., assignors to Lockheed Aircraft Corporation, Los Angeles, Calif.

Application November 5, 1957, Serial No. 694,605

9 Claims. (Cl. 266—4)

This invention relates to shielded arc spotwelding, and more particularly to a device to be used in conjunction with a portable shielded arc spotwelding gun for spotwelding of materials requiring quenching and/or tempering by post-heating subsequent to fusion by welding, with such device being capable of supplying pre-heating of the weld area prior to actual welding fusion.

While it is recognized by the prior art that portable shielded arc spotwelding guns present a high degree of feasible flexibility for sheet metal welding over resistance spotwelding, there are certain limitations as to the type of materials on which satisfactory welds can be achieved. With materials such as AISI 410 Stainless Steel, AISI 420 Stainless Steel, AISI 422 Stainless Steel, and 6 Vanadium-4 Aluminum Titanium alloy, requiring a post-welding quenching and subsequent tempering by further post-heating, use of portable shielded arc spotwelding guns are limited to the size and availability of other equipment necessary to perform such post-welding operation. With a lack of necessary post-welding equipment, or of equipment of sufficient size or capacity, the flexibility of portable shielded arc spotwelding guns is lost by having to resort to resistance spotwelding. Resistance spotwelding, requiring heavier equipment in that a back-up device or apparatus is necessary on the reverse side to supply the forging pressure required, in turn, presents limitations to the size and shape of materials to be welded which has been avoided by the use of portable shielded arc spotwelding guns.

Accordingly, it is an object of this invention to provide a device wherein portable shielded arc spotwelding is accomplished on sheet metal materials requiring post-welding quenching and/or tempering of the weld area.

It is another object of this invention to provide a device for elimination of structure shape limitations on portable shielded arc spotwelding of sheet metal materials requiring post-welding quenching and/or tempering of the weld area.

Another object of this invention is to provide a device for elimination of structure size limitations on portable shielded arc spotwelding of sheet metal materials requiring post-welding quenching and/or tempering of the weld area.

It is still a further object of this invention to provide a device wherein the steps of shielded arc spotwelding, post-welding quenching and/or tempering of weld areas is combined into one continuous operation.

Other objects and advantages will become apparent from the following description taken in connection with the accompanying drawings in which:

Figure 2 is an enlarged sectional view of the head of the portable welding gun shown in Figure 1;

Figure 3 is an end view of the welding gun head shown in Figure 2;

Figure 4 is a perspective view of the end of the welding gun head shown in Figures 2 and 3; and Figure 5 is a schematic of the electrical control circuit incorporated in this invention.

Figure 1:
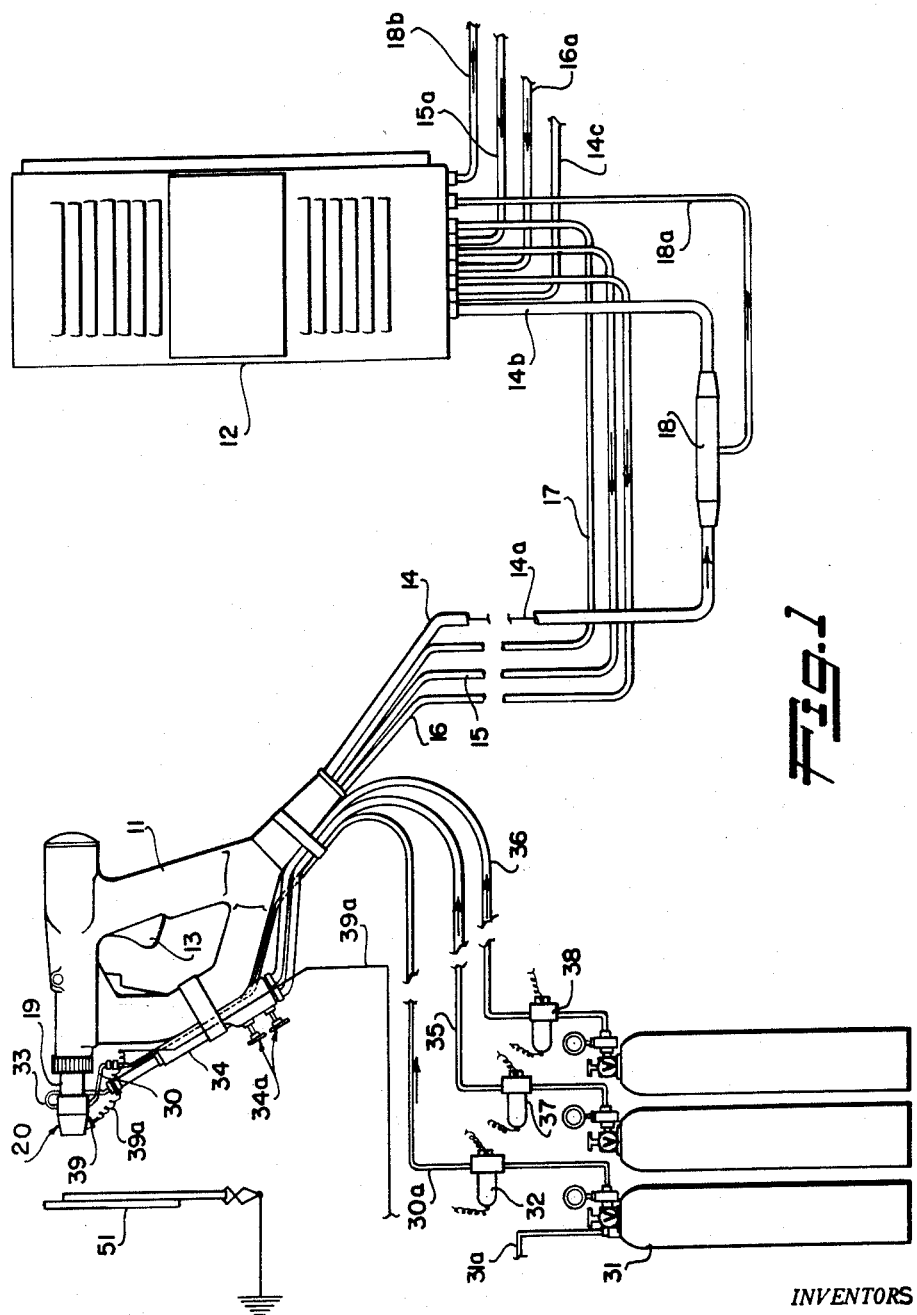
Figure 1 shows a general arrangement and relationship of components incorporating an embodiment of this invention.

Generally stated, the invention is practiced in one form thereof by the addition of a head or cup to the tip of a portable spotwelding gun, with the additional head being in communication with supplies of a quenching medium and combustible gases. An electrical control system is interlocked with the electrical control system of a standard portable shielded arc spotwelding apparatus so that completion of the timed welding cycle is followed by a charge of the quenching medium to the weld area. The flow of quenching medium is followed by a charge of combustible gas to the interior of the supplementary head, which charge is then ignited to accomplish the post-heating or tempering of the weld area upon completion of the welding cycle. If pre-heating of the weld area is desired, a charge of combustible gas may be supplied to the head with ignition thereof prior to the striking of the welding arc.

Referring more particularly to the drawings, in Figure 1 a typical portable spotwelding gun is shown at 11, which is sequentially controlled by control panel 12 upon actuation of welding gun trigger 13. Welding gun 11 is connected to control panel 12 by flexible conduits or hoses 14, 15 and 16, and cable 17. Located within conduit 14 is a well-insulated welding cable 14a which carries the welding current from control panel 12 to the welding electrode (not shown) located in welding gun 11. The diameter of welding cable 14a is substantially smaller than the diameter of the opening in conduit 14 thus providing an annular space through which a coolant fluid such as water may be circulated. Conduit 15 carries the flow of inert gas from the control panel 12 to the welding gun 11 where the gas shields the welding gun electrode (not shown) and the weld area during the welding operation. Cooling water from the control panel 12 is supplied to the welding gun 11 through conduit 16 where the water is introduced to the annular space mentioned above between conduit 14 and welding cable 14a. The cooling water flow is supplied to carry off heat from the welding cable during welding operation. This cooling water flow around the welding cable travels away from welding gun 11 to a connector 18 and through a cooling water return line 18a back to control panel 12. Welding cable 14b extends between panel 12 and connector 18 while welding cable portion 14c connects between panel 12 and the welding machine (not shown). Cable 17 contains the electrical wiring between control panel 12 and the actuating trigger 13 for transmitting control signals from the welding gun operator to control panel 12.

Conduit 15a connects control panel 12 to a source of inert shielding gas (not shown), while conduit 16a delivers cooling water to panel 12 from a suitable source (not shown), and conduit 18b drains off the return water flow passing into panel 12 from conduit 18a.

Welding gun tip or electrode housing 19 has attached by threaded engagement 19a a head or cup assembly 20 (see Figure 2), which comprises a substantially tubular or main body portion 21 with one portion of cylindrical or tubular passage 22 extending therethrough. One end of the passage is tapered as at 23 and the other end of the passage is counterbored to provide a second tubular passage portion or chamber 24 of greater diameter than the first passage portion 22. On the outer surface of body 21 there is an undercut forming shoulder 25 and circumferential surface 26 which is coaxial with the passage 22 and radially inward from the outer surface of body 21. An annular channel 26a is provided in surface 26, and communication is established between annular channel 26a and chamber 24 by a plurality of axially extending holes or passages 28 (see Figures 2 and 3). Annular ring 29 seats on the surface 26 and abuts against shoulder 25 so as to convert channel 26a into an annulus 27. Ring 29 is secured to body 21 by annular silver solder connections 29a and 29b, as shown in Figure 2.

In order tto provide post-weld quenching of the weld area, which is surrounded by surface 21a of body 21 when the welding gun is held or abutted against the workpieces 51 to be welded, a quenching medium is supplied to annulus 27 by tube 30 passing through ring 29 into communication with annulus 27. Flow of the quenching medium from supply 31 through tube 30 to annulus 27 is controlled by a solenoid valve 32 (see Figure 1), control of which will be more fully described below. As shown in Figure 1, an air pressure line 31a is shown connecting quenching medium supply 31 to an air pressure source (not shown) for delivering a liquid quenching medium to the weld area. However, if the quenching medium is in a gaseous form, the air pressure line 31a may be dispensed with as the only control necessary will be the solenoid valve 32 for controlling the flow of the gaseous quenching medium through hose or tubing 30a.

Tube 22 communicates with annulus 27 similarly to tube 30 as described above, and delivers a combustible gas mixture to the weld area through annulus 27, tubular passages 28 and chamber 24. Proportions of the combustible gas mixture, which in the embodiment shown comprises a mixture of hydrogen gas ($H_2$) and oxygen gas ($O_2$), is controlled by a mixing chamber 34 mounted on welding gun 11. Control valves 34a of the mixing chamber 34 regulate the proportional flow of the combustible gases that can flow through hoses or tubings 35 and 36. Solenoid valves 37 and 38 controlling flow of the combustible gases, are similar to solenoid valve 32 and, likewise, will be treated more fully below.

In order for the combustible gas mixture to completely displace the quenching medium from around the weld area in chamber 24, there are provided tangential slots 21b in surface 21a of body 21 equally spaced therearound as indicated in Figures 2, 3 and 4.

To ignite the combustible gas mixture when present in chamber 24 during the operation cycle, there is provided a glow plug 39 inserted into chamber 24 through a threaded opening 40 in the side wall of body 21. Ignition of the combustible gas mixture is accomplished by application of a voltage to glow plug 39 through wire 39a, causing tip 39b to heat due to electrical resistance in plug 39.

Referring to Figure 5, control of the quenching and post-heating portions of the operating cycle is accomplished by a signal being fed to a relay solenoid coil 41 from control panel 12 upon completion of the welding portion of the cycle. This connects solenoid valve 32 to a source of potential identified as B+ through quenching timer 42. Concurrently there is a flow of current through an appropriate time delay network indicated by a variable condenser 43 with resistance 44 in parallel. After a suitable time delay, relay 45 is actuated causing switch arm 45a to swing from contact 45b to contact 45c, causing current to flow through the post-heating timer 46 actuating solenoid valves 37 and 38 to open their associated valves and permit the passage of the combustible gases from their respective supply tanks to the mixing chamber 34 at the same time a potential is supplied to glow plug 39 for ignition of the combustible mixture in chamber 24 in the welding gun head 20. Concurrently, there is a flow through a second appropriate time delay network indicated by a variable condenser 47 with resistance 48 in parallel, and being connected in parallel with the conductors to the solenoid valves 37 and 38 and glow plug 39. After a suitable time delay, relay 49 is actuated similar to relay 45, causing interruption of the current to the combustible gas controlling solenoid valves and glow plug and sending the signal back to the control panel 12 to indicate the end of the quenching and post-heating portions of the cycle.

Should pre-heating of the weld area be desired before striking the welding arc, a signal can be fed to relay solenoid coil 50 whereupon a flow of current will travel from potential source B+ directly to timer 46 through conductor 50a, and thus by-pass the quenching control.

In operation, the welding operator will place the head 20 of welding gun 11 against the workpieces 51 which are to be welded together. By pressing the trigger 13 of welding gun 11, the complete welding cycle is started by a signal going back to the control panel 12 through control cable 17. This causes a signal to be supplied to relay solenoid coil 50 to accomplish the pre-heating portion of the cycle, followed thereafter by the welding portion of the cycle. If pre-heating is not to be used, the signal going back to control panel 12 starts the welding portion of the cycle by causing a flow of welding current to the workpiece through cables 14c, 14b and 14a, with the 14a portion of the welding cable being cooled by a water flow which passes from a source to the control panel 12 through conduit 16a, thence to the welding gun through conduit 16, away from the gun through conduit 14 to connector 18 where the cooling water is removed from around the welding cable and returned to control panel 12 through conduit 18a for discharge to a drain through conduit 18b. During the welding portion of the cycle, the weld area is shielded by an inert gas, such as argon, which flows from a suitable source, not shown, to the control panel through conduit 15a, and thence to the welding gun through conduit 15 where it comes in contact with the electrode and weld area. Upon completion of the weld portion of the cycle, solenoid coil 41 is actuated which causes an electric current to open solenoid valve 32 to permit the flow of a quenching medium from source 31 to the weld area passing through tube 30 into annulus 27 which is in communication with the weld area by chamber 24 and passages 28. After passage of the time delay as controlled by timer 42, solenoid valve 32 is closed and power is supplied to solenoid valves 37 and 38 permitting flow of combustible gases from suitable supplies to mixing chamber 34 attached to welding gun 11. The combustible gas mixture reaches chamber 24 by passing through tube 33 into annulus 27, and thence through passages 28 to chamber 24 where the combustible gas mixture comes in contact with the weld area. Flow of the combustible gas mixture in this manner causes residue of the quenching medium to flow out of chamber 24 to the atmosphere through tangential passages 21b located in surface 21a of the body 21. Current is also supplied to a glow plug 39 inserted in chamber 24 through an opening in the wall of body 21 so as to ignite the combustible gas mixture in chamber 24 at the proper time. After a proper time delay as controlled by timer 46, power is cut off to solenoid valves 37 and 38 and to the glow plug 39, thus cutting off the flow of combustible gas mixture to chamber 24. Solenoid operated relay 49 then is actuated to send a signal back to the control panel 12 to indicate the end of the complete welding cycle comprising a shielded arc spotweld, a post-welding quench of the weld area, and a subsequent heating or tempering of the weld area, with the addition of pre-heating of the weld area if such is used in the complete cycle.

Thus it can be seen that this invention provides a means for spotwelding fabrication of materials requiring a quenching and/or heating or tempering operation subsequent to the actual weld which can be performed with portable equipment on structures or assemblies of any size or shape. Additional flexibility is provided in that such fabrication is accomplished regardless of whether pre-heating of the weld area is included in the complete cycle or not. Furthermore, this type of operation can be performed without regard to consideration of size of heat treating and tempering facilities for the weld area, as such is performed as part of the operation cycle at the time of welding.

It is, of course, intended to cover by the appended claims all such modifications and equivalents as fall within the true spirit and scope of this invention.

What is claimed is:

1. In combination with a shielded electric arc spotwelder, a spotwelding head of substantially tubular shape having a passage therethrough in axial alignment with a spotwelder electrode, a first and second portion of the tubular passage through which the electric welding arc is struck, said first portion of the tubular passage having a smaller diameter than said second portion of the tubular passage, an annulus located around and radially removed from the first portion of the tubular passage, a plurality of passages extending from said annulus to the second portion of the tubular passage thereby establishing communication therebetween, ignition means mounted in the head, and means connecting the annulus with a supply of combustible gas whereby a charge of combustible gas can be delivered to the second portion of the tubular passage and there ignited by said ignition means for heating a weld area either before or after the welding arc.

2. In combination with a shielded electric arc spotwelder, a spotwelding head of substantially tubular shape having a passage therethrough in axial alignment with a spotwelder electrode, a first and second portion of the tubular passage through which the electric welding arc is struck, said first portion of the tubular passage having a smaller diameter than said second portion of the tubular passage, an annulus located around and radially removed from said first portion of the tubular passage, a plurality of passages extending from said annulus to said second portion of the tubular passage thereby establishing communication therebetween, and means connecting the annulus with a supply of quenching medium whereby a charge of quenching medium can be delivered to the second portion of the tubular passage sequentially after the welding arc for quenching of a weld area.

3. In combination with a shielded electric arc spotwelder, a spotwelding head of substantially tubular shape having a passage therethrough in axial alignment with a spotwelder electrode, a first and second portion of the tubular passage through which the electric welding arc is struck, said first portion of the tubular passage having a smaller diameter than said second portion of the tubular passage, an annulus located around and radially removed from the first portion of the tubular passage, a plurality of passages extending from said annulus to the second portion of the tubular passage thereby establishing communication therebetween, ignition means mounted in the head, a first means connecting the annulus with a supply of quenching medium whereby a charge of quenching medium can be delivered to the second portion of the tubular passage sequential to the welding arc for quenching of a weld area, and second means connecting the annulus with a supply of combustible gas whereby a charge of combustible gas can be delivered to the second portion of the tubular passage and there ignited by said ignition means for heating of a weld area either before or after the welding arc.

4. A shielded arc spotwelder head of substantially tubular shape having a passage therethrough in axial alignment with a spotwelder electrode, a first and second portion of the tubular passage through which the electric welding arc is struck, said first portion of the tubular passage having a smaller diameter than said second portion of the tubular passage, an annulus located around and radially removed from the first portion of the tubular passage, a plurality of passages extending from said annulus to the second portion of the tubular passage thereby establishing communication therebetween, ignition means mounted in the head, a first means connecting the annulus with a supply of quenching medium whereby a charge of quenching medium can be delivered to the second portion of the tubular passage sequentially after the welding arc for quenching of a weld area, a second means connecting the annulus with a supply of combustible gas whereby a charge of combustible gas can be delivered to the second portion of the tubular passage and there ignited by said ignition means for heating of a weld area sequentially with the welding arc, and control means for sequentially controlling the quenching and heating of the weld area.

5. A device as claimed in claim 4 wherein the control means are electrical and the sequential control is achieved by time delay means.

6. An electric arc spotwelding device comprising a spotwelding machine including an electrode housing, in combination with a head attached to said housing, said head containing a chamber, means supplying said chamber with a charge of combustible gas, and ignition means communicating with the chamber whereby actuation of said ignition means ignites the combustible gas in the chamber to supply heat to a weld area sequentially with the welding portion of an electric arc welding cycle.

7. An electric arc spotwelding device comprising a spotwelding machine including an electrode housing, in combination with a head attached to said housing, said head containing a chamber, and means supplying said chamber with a charge of a quenching medium whereby said quenching medium can be supplied to a weld area for quenching thereof sequentially with the welding portion of an electric arc welding cycle.

8. An electric arc spotwelding device comprising a spotwelding machine including an electrode housing, in combination with a head attached to said housing, said head containing a chamber, means supplying said chamber with a charge of a quenching medium and a charge of combustible gas, and ignition means communicating with the chamber for ignition of said combustible gas supplied to the chamber upon actuation of said ignition means, whereby said combination provides both quenching and heating of a weld area sequentially with the weld portion of an electric arc welding cycle.

9. The combination as claimed in claim 8 in further combination with control means for sequentially controlling the quenching and heating of the weld area in conjunction with the weld portion of the electric arc welding cycle.

References Cited in the file of this patent

UNITED STATES PATENTS

| | | |
|---|---|---|
| 1,556,880 | Royer | Oct. 13, 1925 |
| 2,148,797 | Barna | Feb. 28, 1939 |
| 2,317,221 | Riemenschneider | Apr. 20, 1943 |
| 2,335,330 | Wigton | Nov. 30, 1943 |
| 2,424,270 | Ehemann et al. | July 22, 1947 |
| 2,695,660 | Rummler | Nov. 30, 1954 |
| 2,845,524 | Morley et al. | July 29, 1958 |